US012562014B2

(12) United States Patent
Dinesh et al.

(10) Patent No.: US 12,562,014 B2
(45) Date of Patent: Feb. 24, 2026

(54) METHOD AND SYSTEM FOR OPTIMIZING ADAS TESTING

(71) Applicant: L&T TECHNOLOGY SERVICES LIMITED, Chennai (IN)

(72) Inventors: Harshitha Dinesh, Mysore (IN); Gokul Anil Deepa, Thiruvananthapuram (IN); Akash Shivani Shivashankaraiah, Bengaluru (IN); Aditya Laxman Rao, Mysore (IN); Dhanush Devarahalli Rangaswamy, Davanagere (IN); Ramineni Nithin Kumar, Hyderabad (IN); Tirumanyam Subramanyam, Tirupathi (IN); Chinmay Rojindar, Indore (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 29 days.

(21) Appl. No.: 18/809,406

(22) Filed: Aug. 20, 2024

(65) Prior Publication Data

US 2025/0201039 A1 Jun. 19, 2025

(30) Foreign Application Priority Data

Dec. 14, 2023 (IN) .............................. 202341085611

(51) Int. Cl.
*G07C 5/08* (2006.01)
*G06F 3/16* (2006.01)
*G06N 20/00* (2019.01)

(52) U.S. Cl.
CPC ........... *G07C 5/0808* (2013.01); *G06F 3/162* (2013.01); *G06N 20/00* (2019.01)

(58) Field of Classification Search
CPC .............................. G06N 20/00; G07C 5/0808
See application file for complete search history.

(56) References Cited

U.S. PATENT DOCUMENTS

| | | | | |
|---|---|---|---|---|
| 2021/0335061 A1* | 10/2021 | Claessens | ............ | G07C 5/0816 |
| 2021/0335064 A1* | 10/2021 | Kim | ...................... | G07C 5/0808 |
| 2024/0404544 A1* | 12/2024 | Kapshii | ............... | G10L 21/0264 |

FOREIGN PATENT DOCUMENTS

CN      201811400838.4  A      3/2019

OTHER PUBLICATIONS

Muhammad Turab, Teerath Kumar, Malika Bendechache, and Takfarinas Saber; Investigating Multi-Feature Selection and Ensembling for Audio Classification; arXiv: 2206.07511; Jun. 15, 2022.

* cited by examiner

*Primary Examiner* — Aaron L Troost
(74) *Attorney, Agent, or Firm* — Kendal M. Sheets

(57) ABSTRACT

The present invention describes an Artificial Intelligence (AI) based Advanced Driver Assistance System (ADAS) testing tool. The testing tool comprises a processing unit configured to filter out, using a pre-trained noise cancellation ML model, the received audio signals to isolate noise signals from the received audio signals. Sequentially, the processing unit is configured to, using a using a pre-trained audio classification ML model, identify one or more audio signal from the filtered-out audio signals relating to ADAS audio signals and classify each of the one or more identified signals into a frequency class based on their distinct frequency characteristics. Finally, the processing unit is configured to evaluate each of the classified signal based on ADAS actions associated with the vehicle and generate test results of ADAS testing on each of the classified audio signals, based on the evaluation.

15 Claims, 7 Drawing Sheets

300-A

OBTAINING UNIT
302

TRAINING UNIT
304

106

400

OBTAINING UNIT
402

GENERATING UNIT
404

ACTIVATION LAYER
410

DIVIDING UNIT
406

TRAINING UNIT
408

REGULARIZATION MODULE
412

FIRST ACTIVATION FUNCTION
414

SECOND ACTIVATION FUNCTION
416

106

400-B

RECEIVE PLURALITY OF AUDIO SIGNALS FROM A VEHICLE — 410

IDENTIFY WHETHER THE AUDIO SAMPLES IS ADAS AUDIO SAMPLE OR NON-ADAS AUDIO SAMPLE — 412

IDENTIFY AUDIO CLASS OF THE SET OF AUDIO SAMPLES — 416

CALCUALTE BINARY CROSS-ENTROPY LOSS — 414

CALCUALTE CATEGORICAL CROSS-ENTROPY LOSS — 418

CALCULATE GRADIENT OF LOSS — 420

UPDATE THE PARAMETERS OF THE ML MODEL — 422

METHOD AND SYSTEM FOR OPTIMIZING ADAS TESTING

TECHNICAL FIELD

The present invention generally relates to the field of an Advanced Driver Assistance System (ADAS) testing of a vehicle.

BACKGROUND

The following description includes information that may be useful in understanding the present invention. It is not an admission that any of the information provided herein is prior art or relevant to the presently claimed invention, or that any publication specifically or implicitly referenced is prior art.

Many vehicles manufactured in recent years include driver safety systems aimed at increasing vehicle safety, and more generally, road safety. An exemplary driver safety system on a vehicle is an Advanced Driver Assistance System (ADAS), which is an electronic system aimed at providing assistance or alerts to the driver while driving or parking the vehicle. Human error plays a role in many road accidents, and thus, an objective of ADAS may be automating, adapting, and enhancing vehicle systems to mitigate human error. To ensure reliability and safety of ADAS, testing of the ADAS in automotive electronic control unit is essential.

Conventionally, ADAS testing is related to a manual and labor-intensive process. This process involves the tester creating various combinations of scenarios and performing tests manually. The manual testing requires some testing tool such as pico-scopes and oscilloscopes. However, this manual approach to perform testing is time-intensive due to required human intervention and it is prone to human error. Additionally, the conventional ADAS testing has challenges related to accuracy in tone measurements, multiple tone testing, tone priority-based testing.

As a result, there is a need for a more efficient and automated ADAS testing system for vehicle.

SUMMARY OF THE DISCLOSURE

The present disclosure overcomes one or more shortcomings of the prior art and provides additional advantages discussed throughout the present disclosure. Additional features and advantages are realized through the techniques of the present disclosure. Other embodiments and aspects of the disclosure are described in detail herein and are considered a part of the claimed disclosure.

In an aspect, the present disclosure recites an Artificial Intelligence (AI) based Advanced Driver Assistance System (ADAS) testing tool. The testing tool comprises an input interface configured to receive plurality of audio signals from a vehicle and a processing unit operatively coupled to the input interface. The processing unit is configured to filter out, using a pre-trained noise cancellation ML model, the received audio signals to isolate noise signals from the received audio signals. Sequentially, the processing unit is configured to, using a using a pre-trained audio classification ML model, identify one or more audio signal from the filtered-out audio signals relating to ADAS audio signals and classify each of the one or more identified signals into a frequency class based on their distinct frequency characteristics. Finally, the processing unit is configured to evaluate each of the classified signal based on ADAS actions associated with the vehicle and generate test results of ADAS testing on each of the classified audio signals, based on the evaluation.

In another aspect, the present disclosure recites, to generate the test result, the processing unit configured to identify the ADAS actions associated with the vehicle, determine sample frequency classes based on the identified ADAS actions. Further, the processing unit is configured to validate the frequency class of each of the one or more identified signal with the determined sample frequency classes and generate the test results based on the validation.

In another aspect, the present disclosure recites, to train the noise cancellation model, the processing unit configured to obtain a plurality of clean audio samples and a plurality of contaminated audio signals, including various noises, corresponding to the clean same audio samples from at least a server. The processing unit is further configured to filter out the contaminated audio signals to isolate noise signals and clean audio samples and train the noise cancellation model based on the filtering.

In another aspect, the present disclosure recites, in order to train the audio classification ML model, the processing unit configured to obtain audio samples from at least a server and generate multiple audio samples for each of the obtained audio sample by performing time-shift operation. Sequentially, the processing unit is configured to extract time and frequency parameters for the generated audio samples. Finally, the processing unit is configured to train the classification ML model by using the time and frequency parameters of the generated audio samples to distinguish between ADAS audio signal or non ADAS audio signal and train the classification ML model by using the time and frequency parameters of the generated ADAS audio samples to identify the audio classes of the audio samples.

In another aspect, the present disclosure recites, in order to update parameters of the classification ML model, the processing unit configured to obtain, from the at least server, characteristics information of each of the generated audio samples, wherein the characteristics information indicates whether the audio sample is the ADAS audio signal and the respective audio class. Further, the processing unit is configured to divide the generated audio samples into a plurality of a set of audio samples and distinguish, by the classification ML model, the set of audio samples between the ADAS audio signal or the non ADAS audio signal to generate first set of predictions. Sequentially, the processing unit is configured to identify, by the classification ML model, the audio class of the set of audio samples to generate second set of predictions. Finally, the processing unit is configured to generate loss based on the generated first set of predictions, the generated second set of predictions, and the obtained information and update parameters associated with the classification ML model based on the generated loss during the training of the classification ML model.

In an aspect, the present disclosure may recite a method for an Artificial Intelligence (AI) based Advanced Driver Assistance System (ADAS) testing tool. The method includes receiving plurality of audio signals from a vehicle and filtering out, using a pre-trained noise cancellation ML model, the received audio signals to isolate noise signals from the received audio signals. Sequentially, the method includes, using a pre-trained audio classification ML model, identifying one or more audio signal from the filtered-out audio signals relating to ADAS audio signals and classifying each of the one or more identified signals into a frequency class based on their distinct frequency characteristics. Finally, the method includes evaluating each of the classified signal based on ADAS actions associated with the vehicle and generating test results of ADAS testing on each of the classified audio signals, based on the evaluation.

In another aspect, the present disclosure recites a method for generating the test result that include identifying the ADAS actions associated with the vehicle and determining sample frequency classes based on the identified ADAS actions. Sequentially, the method includes that includes validating the frequency class of each of the one or more identified signal with the determined sample frequency classes and generating the test results based on the validation.

In another aspect, the present disclosure recites a method for training the noise cancellation model that includes obtaining a plurality of clean audio samples and a plurality of contaminated audio signals, including various noises, corresponding to the clean same audio samples from at least a server. Sequentially, the method includes filtering out the contaminated audio signals to isolate noise signals and clean audio samples and training the noise cancellation model based on the filtering.

In another aspect, the present disclosure recites a method for training the audio classification ML model that includes obtaining audio samples from at least a server and generating multiple audio samples for each of the obtained audio sample by performing time-shift operation. Sequentially, the method include extracting time and frequency parameters for the generated audio samples. Finally, the method includes training the classification ML model by using the time and frequency parameters of the generated audio samples to distinguish between ADAS audio signal or non ADAS audio signal and training the classification ML model by using the time and frequency parameters of the generated ADAS audio samples to identify the audio classes of the audio samples.

In another aspect, the present disclosure recites a method for updating parameters of the classification ML model, that includes obtaining, from the at least server, characteristics information of each of the generated audio samples, wherein the characteristics information indicates whether the audio sample is the ADAS audio and the respective audio class. Additionally, the method includes dividing the generated audio samples into a plurality of a set of audio samples and distinguishing, by the classification ML model, the set of audio samples between the ADAS audio signal or the non ADAS audio signal to generate first set of predictions. Sequentially, the method includes identifying, by the classification ML model, the audio class of the set of audio samples to generate second set of predictions. Finally, the method includes generating loss based on the generated first set of predictions, the generated second set of predictions, and the obtained information and updating parameters associated with the classification ML model based on the generated loss during the training of the classification ML model.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The embodiments of the disclosure itself, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings in which.

Figure 1:
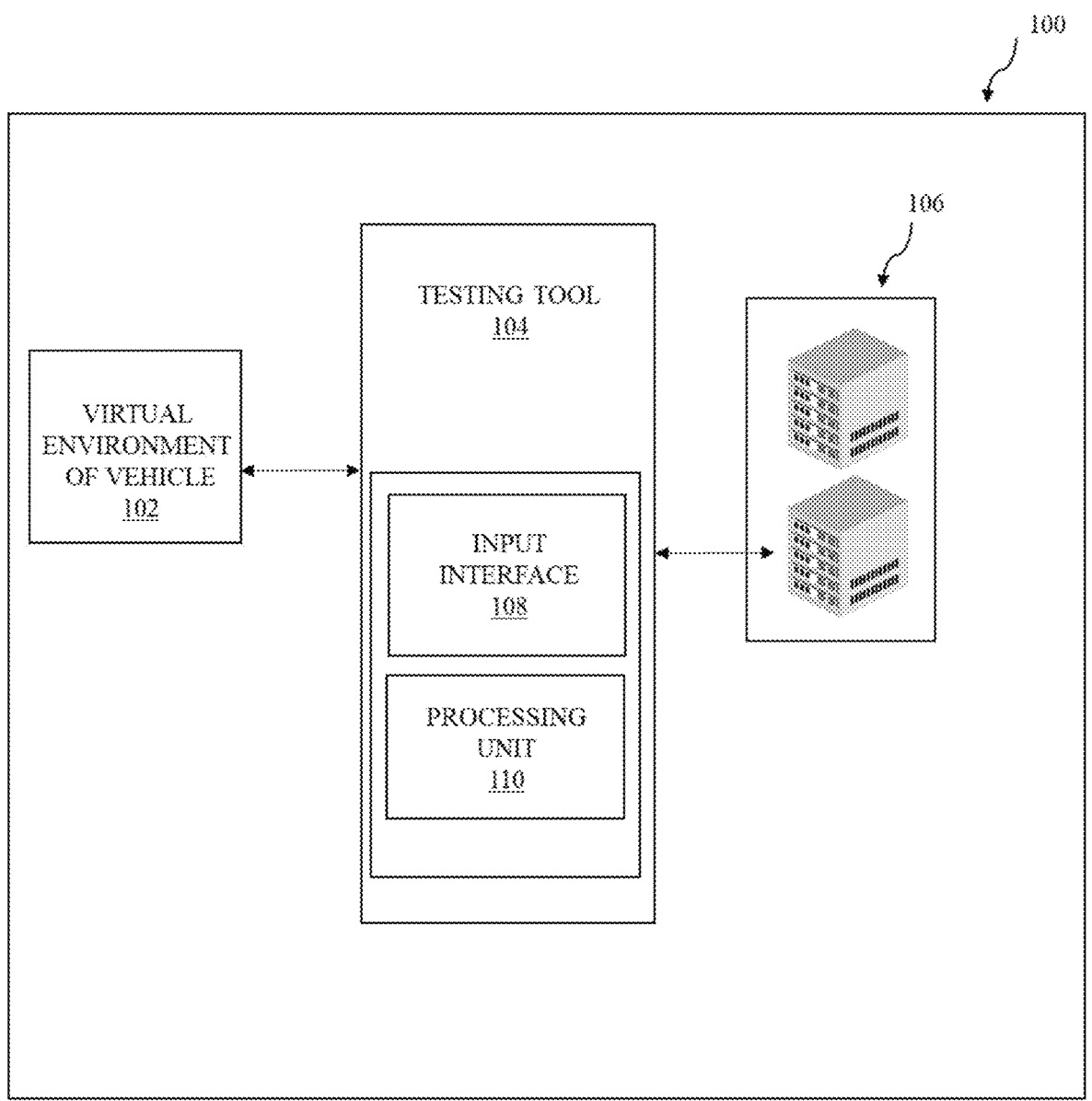
FIG. 1 illustrates an environment architecture of AI based ADAS testing tool for a vehicle, in accordance with an embodiment of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. It should be appreciated by those skilled in the art that the conception and specific embodiment disclosed may be readily utilized as a basis for modifying or designing other structures for carrying out the same purposes of the present disclosure.

Various embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements.

The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The phrase "vehicle" may be used throughout the disclosure. The vehicle may be a car, truck, semi-truck, motorcycle, moped, scooter, or other type of transportation.

The phrase "artificial intelligence" refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

The phrase "machine learning" is used throughout the disclosure. The machine learning broadly describes a function of systems that learn from data. A machine learning system, engine, or module can include a machine learning algorithm that can be trained to learn functional relationships between inputs and outputs that are currently unknown. In one or more embodiments, machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

Machine learning may be classified into supervised learning, unsupervised learning, and reinforcement learning according to a learning method. The supervised learning may refer to a method of learning an artificial neural network in a state in which a label for learning data is given, and the label may mean the correct answer (or result value) that the artificial neural network must infer when the learning data is input to the artificial neural network. Unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

The phrase Advanced Driver Assistance System (ADAS) in the vehicle is used throughout the disclosure. The ADAS in the vehicle is used to enhance safety and convenience of driving. The ADAS system leverage sensors, cameras, radar, and sophisticated algorithms to provide real-time assistance to drivers. ADAS may include Lane Departure Warning (LDW), Adaptive Cruise Control (ACC), Night Vision System (NVS), Around View Monitoring (AVM), Blind Spot Detection (BSD), Rear Collision Warning (RCW), Traffic Signals Recognition (TSR), and Head Up Display (HUD). Adaptive features provided by ADAS may automate lighting, provide adaptive cruise control and collision avoidance, implement pedestrian crash avoidance mitigation (PCAM), incorporate satellite navigation warnings and traffic warn-ings, alert drivers to other vehicles or obstructions, automate lane centering, provide blind spot alerts, or connect smartphones to the vehicle's infotainment center for navigation instructions.

Disclosed herein is an Artificial Intelligence (AI) based Advanced Driver Assistance System (ADAS) testing tool. The testing tool comprises an input interface configured to receive plurality of audio signals from a vehicle and a processing unit operatively coupled to the input interface. The processing unit may be configured to filter out, using a pre-trained noise cancellation ML model, the received audio signals to isolate noise signals from the received audio signals and identify, using a pre-trained audio classification ML model, one or more audio signal from the filtered-out audio signals relating to ADAS audio signals. Further, the processing unit may be configured to classify, using the pre-trained audio classification ML model, each of the one or more identified signals into a frequency class based on their distinct frequency characteristics. Finally, the processing unit may be configured to evaluate each of the classified signal based on ADAS actions associated with the vehicle and generate test results of ADAS testing on each of the classified audio signals, based on the evaluation.

An embodiment of the present disclosure may provide a method and a system that performs an automated procedure in order to perform ADAS testing which reduces chances of error in performing ADAS testing. Additionally, the system and method may enhance the testing procedure and generate precise test result by providing integration of pre-trained machine learning models for noise cancellation and audio classification.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details.

FIG. 1 illustrates an environment architecture 100 of AI based ADAS testing tool for a vehicle, in accordance with an embodiment of the present disclosure. The environment architecture 100 may be constituted by virtual environment of a vehicle 102, a testing tool 104, and at least a server 106. All the constituent elements of the environment architecture 100 illustrated in FIG. 1 are essential constituent elements, however the environment architecture 100 may be implemented by more constituent elements than the constituent elements illustrated in FIG. 1. However, the same are not explained for the sake of brevity.

In an embodiment, the virtual environment of the vehicle 102 may replicate conditions and scenario encountered in real-world driving. This virtual environment of the vehicle 102 may be used for testing ADAS functionality such as collision avoidance, automatic braking, lane-keeping assistance, and so on.

In an embodiment, the testing tool 104 may constitute of an input interface 108 and a processing unit 110. It may be noted, all the constituent elements included in the testing tool 104 illustrated in FIG. 1 are essential constituent elements, however the testing tool 104 may be implemented by more constituent elements than the constituent elements illustrated in FIG. 1 and the same are not explained for the sake of brevity. Further, all the constituent elements of the testing tool 104 may communicate with each other via wireless/wired communication network. The detailed functioning of the testing tool 104 is further explained in FIG. 2 in forthcoming paragraphs of the present disclosure.

In an exemplary embodiment, the testing tool 104 may be implemented in a variety of computing systems, such as a laptop computer, a desktop computer, a notebook, a server, a network server, a cloud-based server and the like that may be electronically coupled to Electronics Control Unit (ECU) of the vehicle (not shown) under test for ADAS testing.

In an embodiment, the at least server 106 may be configured to communicate with the testing tool 104 in order to provide different information to the testing tool 104. In particular, the at least server 106 may include an application programming interface (API) to provide different information to the testing tool 104. The API may be used to enable software applications to interact with other software applications or services. API use standardized protocols and data formats to enable communication between applications, such as HTTP or REST. By the functioning of the API, the API may provide different information to the testing tool 104.

Figure 2:
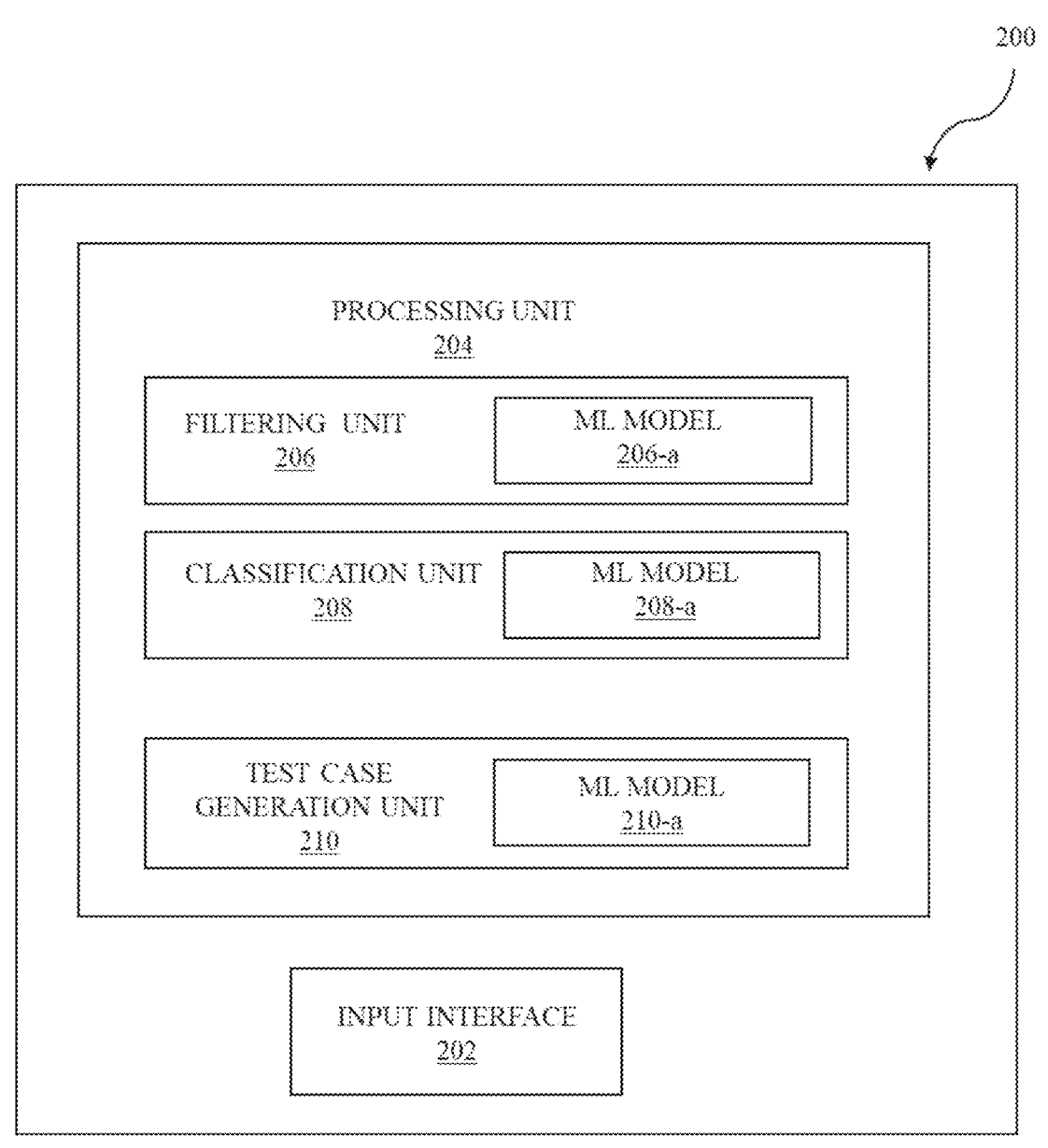
FIG. 2 illustrates AI based ADAS testing tool for a vehicle by way of block diagram, in accordance with an embodiment of the present disclosure.

Moving towards FIG. 2 that illustrates an AI based ADAS testing tool 200 (same as the testing tool 104 of FIG. 1) for a vehicle (not shown) under test, in accordance with an embodiment of the present disclosure. It must be appreciated by a person skilled in art that testing tool 200 may also be implemented in various environments, other than as shown in FIG. 2.

According to an embodiment of the present disclosure, the testing tool 200 may be constituted by an input interface 202 (same as the input interface 108 of FIG. 1) and a processing unit 204 (same as the processing unit 110 of FIG. 1). All the constituent elements of the testing tool 200 illustrated in FIG. 2 are essential constituent elements, and the testing tool 200 may be implemented by more constituent elements than the constituent elements illustrated in FIG. 2, however the same are not explained for the sake of brevity. All the constituent elements of the testing tool 200 may communicate with each other via wireless connection, electric connection, or combination of both.

In an embodiment, the input interface 202 may be an interface that allows the testing tool 200 to receive and transmit sound signal. In an exemplary embodiment, the input interface 202 may include microphone, audio sensors, hardware connection points (such as USB, audio jack) and so on. In an additional embodiment, the input interface 202 may be in communication with the at least server 106 and may be configured to receive information from the at least server 106 required to perform testing process on the testing tool 200.

During, the testing of the ADAS system, the input interface 202 may serve as an initial point of interaction between the testing tool 200 and the vehicle. The input interface 202 may be configured to receive audio signals from the vehicle. The audio signal may be sound signal generated by various ADAS-related actions. The input interface 202 may be designed to receive multiple audio signals simultaneously which are related to multiple ADAS systems.

After receiving the audio signals, the input interface 202 may provide the audio signals to a filtering unit 206 of the processing unit 204. The filtering unit 206 may perform the filtering process on the audio signals to isolate the noise signals from the audio signals. In order to isolate the noise signals from the audio signals the filtering unit 206 may use a pre-trained noise cancellation ML model (i.e., ML model 206-*a*). The ML model 206-*a* may analyze the audio signals and separate the noise components from the audio signals based on the training of the ML model 206-*a*. The ML model 206-*a* may correspond to a model that is trained on a dataset in order to learn the difference between the noise signals and the desired audio signals. The training of the ML model 206-*a* is further explained in forthcoming paragraphs in conjunction with FIG. 3.

In an exemplary embodiment, the ML model 206-*a* may be an autoencoder. The autoencoder may be used to learn efficient coding of unlabeled data, typically for the purpose of dimensionality reduction. The autoencoder may employ unsupervised learning to learn a representation (encoding) for a set of data, typically for the purpose of reducing the dimensionality of the data. The autoencoder may be trained to compress the input into a lower-dimensional code and then to reconstruct the output from this representation to match the original input as closely as possible.

After extracting noise components, the filtering unit 206 may provide the filtered signals (audio signals without noise components) to a classification unit 208. The classification unit 208 may perform two-step process on the filtered signals by using a pre-trained audio classification ML model (i.e., ML model 208-*a*).

In first step of the two-step process, the ML model 208-*a* may perform features extraction process on the filtered signals. The features may include specific frequency-domain characteristics, time-domain characteristics, and other characteristics relevant to ADAS activity. For example, the ML model 208-*a* may utilize Mel-Frequency Cepstral Coefficients (MFCC) technique to extract unique frequency spectrum associated with ADAS sound such as tone related to lane departure warning tone, forward collision warning, and so on. The ML model 208-*a* may determine whether the filtered signals may be ADAS signal or not based on the extracted features.

In one non-limiting embodiment, if the filtered signals may be different from the ADAS signal, the testing tool 200 may not perform further process on the filtered signal and stop the process on the filtered signal.

In another non-limiting embodiment, if the filtered signals may be the ADAS signal, the ML model 208-*a* may perform second step of the process. In the second step, the ML model 208-*a* may be configured to identify the tone (such as tone related to lane departure warning tone, forward collision warning, and so on) class of the filtered signals based on the frequency characteristics of the filtered signal. For example, when a ADAS signal may be received by the ML model 208-*a*, the ML model 208-*a* may be configured to identify the frequency characteristics and assign a class to the ADAS signal based on the frequency characteristics. In an exemplary embodiment, the class 6 may represent a specific sound pattern in the audio signal associated with the particular driver assistance feature (i.e., particular ADAS event) and class 12 may represent another distinct pattern sound pattern related to different ADAS event. Further, those skilled in the art will appreciate that present disclosure in view of class of ADAS signal may be not limited to above exemplary embodiment but can be extended to various type of class ADAS signal. The training of the ML model 208-*a* may be further explained in forthcoming paragraphs in conjunction with FIG. 4.

In a non-limiting exemplary embodiment of the present disclosure, the ML model 208-*a* may receive two audio signals. The ML model 208-*a* may identify that the first audio signal may correspond to the ADAS signal based on the features of the first audio signal and second audio signal may correspond to the non-ADAS signal based on the features of the second audio signal. After the identification process indicating whether the signal may be ADAS or not, the ML model 208-*a* may not proceed further with the second audio signal and perform classification process on the first audio signal to identify the tone class of the first audio signal.

After identifying the ADAS classes (i.e., tone class), the classification unit 208 may provide the information related to ADAS class of the filtered ADAS signal to a test case generation unit 210.

The test case generation unit 210 may receive controller area network (CAN) messages with events from the vehicle before receiving the ADAS class information of the audio signals. In a non-limiting exemplary embodiment of the present disclosure, when the audio signal is generated from the environment of the vehicle, at the same time CAN message may be generated. The generated CAN message may indicate ADAS action (event associated with the vehicle) information for which the audio signal is generated. The vehicle may provide the generated CAN message to the test case generation unit 210 via the input interface 202. After receiving the CAN message, the test case generation unit 210 may determine sample frequency classes based on the CAN message from the different test cases by using an ML model 210-*a*.

The different test cases may be generated at a time of training of the ML model 210-*a*. Now moving towards the training of the ML model 210-*a*. In an embodiment, during the training of the ML model 210-*a*, a random number generator may generate different type of test cases for a particular CAN status. For example, a CAN status may indicate door status and car status. For this CAN status number of test cases are generated. Test case 1 indicates door is closed and car is moving with the ADAS class P1, test case 2 indicates door is open and car is moving with the ADAS class P2, test case 3 indicates door is open and car is not moving with the ADAS class P3. During the training, the ML model 210-*a* may be trained on the multiple CAN status and their respective test cases in order to perform real-time operation of the ML model 210-*a*. The respective test cases also include tone class as described in above exemplary embodiment related to training of the ML model 210-*a*.

Coming back to the identification of the frequency class (i.e., tone class) based on the CAN message. In an embodiment, the ML model 210-*a* may be configured to identify the particular type of test case based on the CAN message (such as door is open, and car is moving) and determine frequency class associated with the test case based on the CAN message. After determining the frequency class, the ML model 210-*a* may validate the frequency class of the audio signal with the determined frequency class based on the CAN message. Based on the validation, the ML model 210-*a* may generate test results which may indicate whether the frequency class of the audio signal is similar to the determined frequency class. If these are similar, the ML model 210-*a* may provide a positive result for that ADAS system and otherwise provide negative result.

In an embodiment, the validation process may be performed for multiple audio signals simultaneously or may be performed sequentially for multiple audio signals.

Further, to understand the disclosure of forgoing paragraphs discussed in conjunction with FIG. 2 above, the operation of the testing tool 200, an exemplary embodiment may be considered. For example, from the vehicle environment, the testing tool 200 may receive a CAN message related to lane change event. Simultaneously, the testing tool 200 may receive the audio signal. At the beginning, the testing tool 200 may extract noise from the audio signal and identify whether the audio signal may be associated with the ADAS audio. After determination that the audio signal may be ADAS audio, the testing tool 200 may identify the tone class of the audio signal. Finally, the testing tool 200 may compare the tone class of the audio signal with the tone class associated with the CAN message and identify whether the audio signal may be associated with lane change event tone based on the comparison. The above exemplary embodiment is related to signal tone measurements testing. However, the scope of the present disclosure is not limited to said example but can be extended to various ADAS signals related to the vehicle.

Further those skilled in the art will appreciate that the scope of the testing tool 200, discussed in the present disclosure, may be extended to perform testing related to multi-tone testing, priority-based testing, and so on and is non limiting in any sense.

Figure 3A:
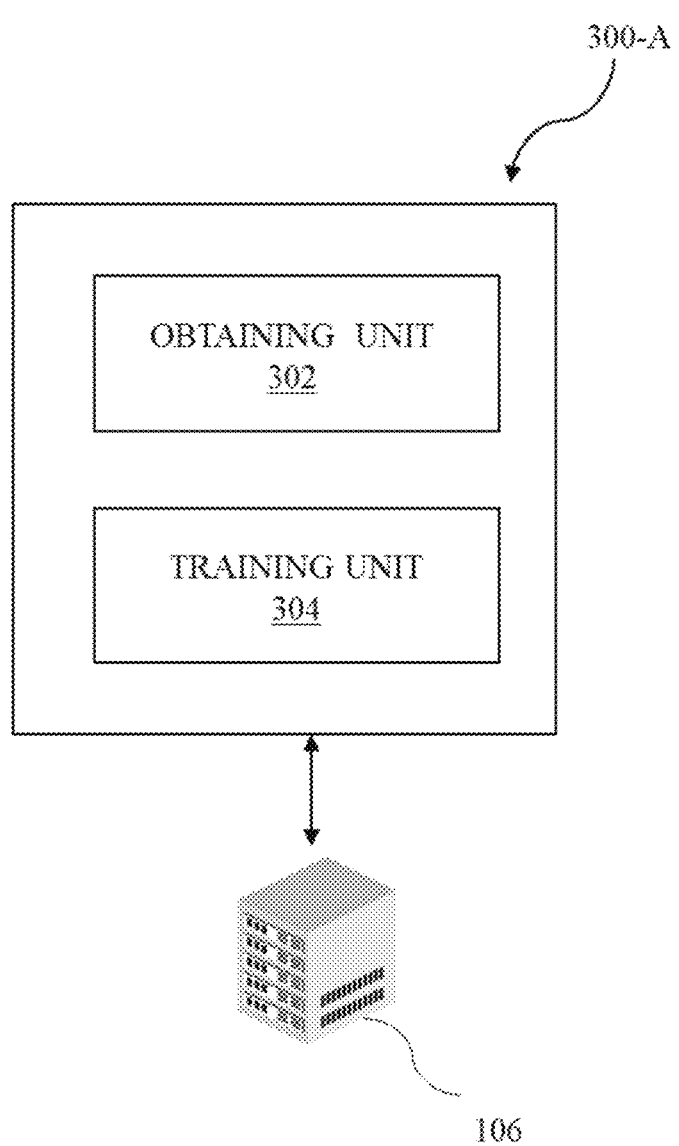
FIG. 3A illustrates training of noise cancellation ML model, in accordance with an embodiment of the present disclosure.

Moving towards FIG. 3A that illustrates training of noise cancellation ML model 300-A (same as the ML model 206-*a* of FIG. 2), in accordance with an embodiment of the present disclosure. The ML model 300-A may constitute of an obtaining unit 302 and a training unit 304. All the constituent elements of the ML model 300-A illustrated in FIG. 3A are essential constituent elements, and the ML model 300-A may be implemented by more constituent elements than the constituent elements illustrated in FIG. 3A, however the same are not explained for the sake of brevity. All the constituent elements of the ML model 300-A may communicate with each other via wireless connection, electric connection, or combination of both.

In an embodiment, the obtaining unit 302 may obtain clean audio samples and contaminated audio samples, including various noises, corresponding to the same clean audio samples from the at least server 106. The clean audio samples represent desire noise free samples, while contaminated audio samples may include clean audio samples along with the various noises that may be present in real-time environment of the vehicle.

The obtaining unit 302 may provide the clear audio samples and the contaminated audio samples to the training unit 304. The training unit 304 may perform a filtering process on the contaminated noise samples in order to filter out the noise from the contaminated noise samples. After computing filtering process, the training unit 304 may compare predicated output of the filtering process with the clear audio samples (i.e., desired output). The training unit 304 may compute an error between predicated output and the desired output and adjust parameters iteratively to minimize the error between the predicated output and the desired output.

Figure 3B:
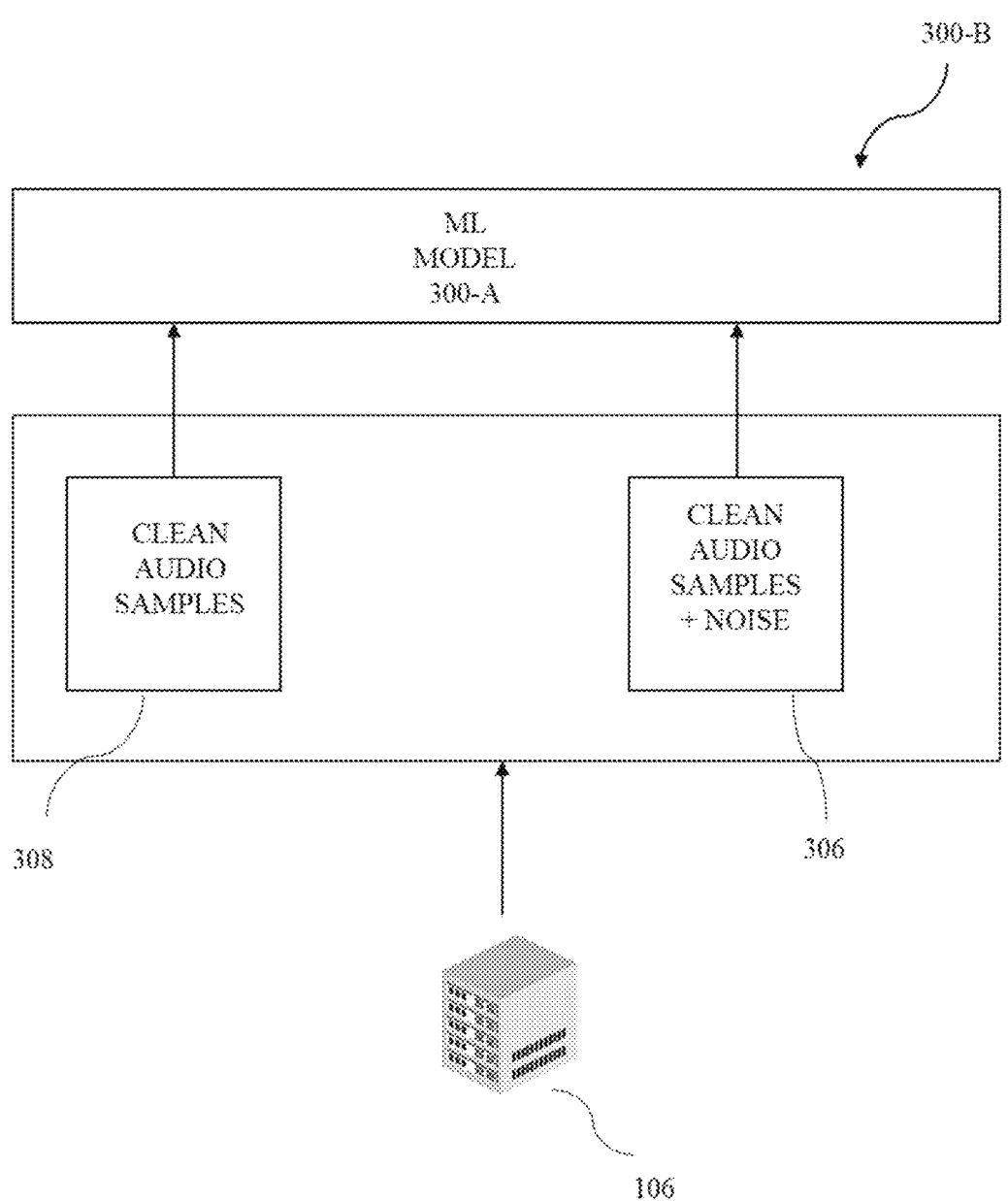
FIG. 3B illustrates communication environment between the at least server 106 and the ML model 300-a to obtain training data 300-B, in accordance with an embodiment of the present disclosure.

Moving towards FIG. 3B that illustrates communication environment between the at least server 106 and the ML model 300-A to obtain training data, in accordance with an embodiment of the present disclosure. The at least server 106 may be in communication with the ML model 300-A to provide training data including a first data 306 and a second data 308.

In an embodiment, the first data 306 may include clean audio samples along with the various noises and the second data 308 may include clean audio samples. The ML model 300-A may perform noise cancellation process on the first data 306 in order to get the desire output (i.e., second data 308).

Figure 4A:
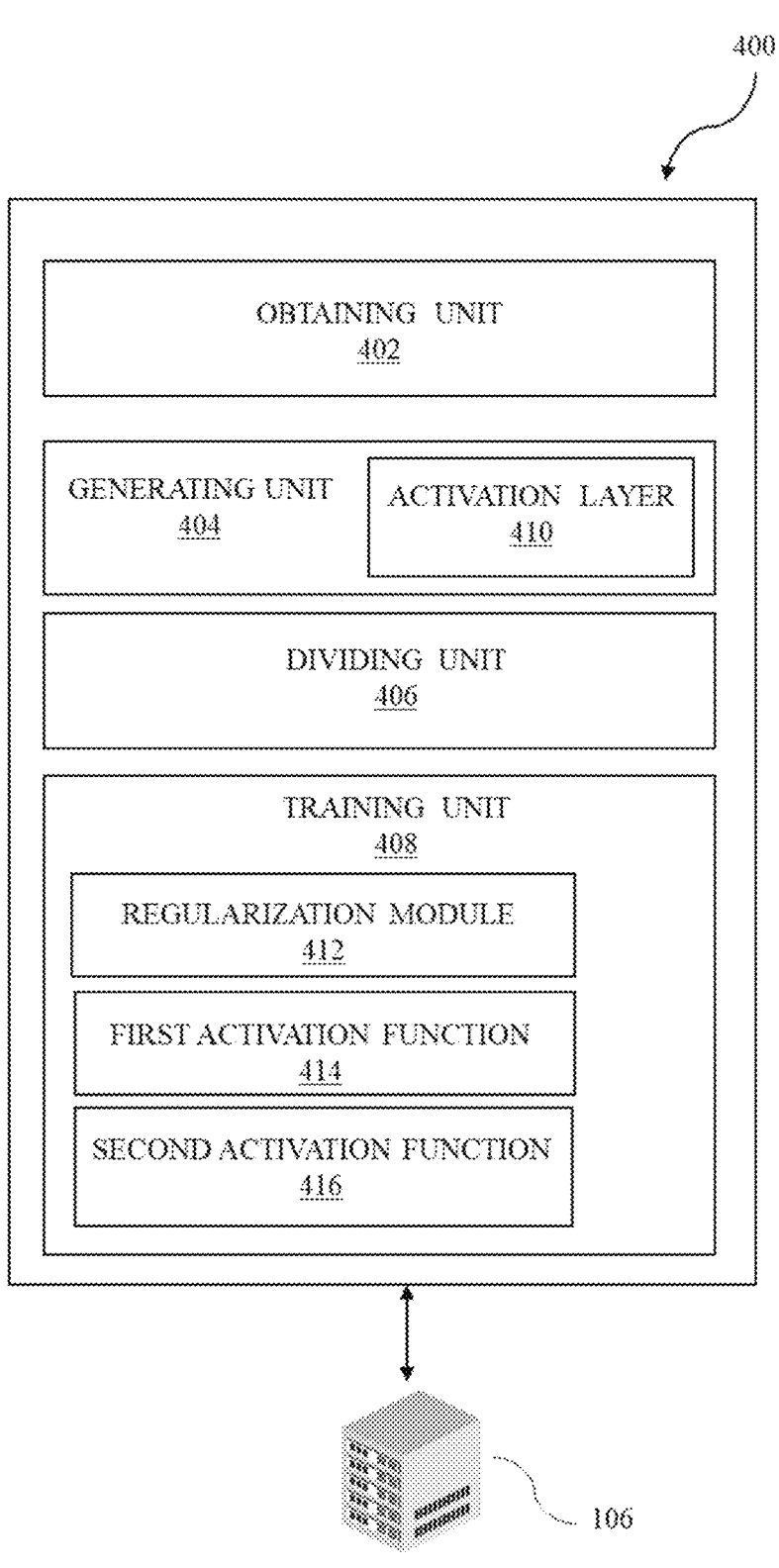
FIG. 4A illustrates training of training of audio classification ML model, in accordance with an embodiment of the present disclosure.

Now moving towards FIG. 4A that illustrates training of audio classification ML model 400-A (same as the ML model 208-*a* of FIG. 2), in accordance with an embodiment of the present disclosure. The ML model 400-A may be constituted by an obtaining unit 402, a generating unit 404, a dividing unit 406, and a training unit 408. All the constituent elements of the ML model 400-A illustrated in FIG. 4A are essential constituent elements, and the ML model 400-A may be implemented by more constituent elements than the constituent elements illustrated in FIG. 4A, however the same are not explained for the sake of brevity. All the constituent elements of the ML model 400-A may communicate with each other via wireless connection, electric connection, or combination of both.

In an embodiment, the obtaining unit 402 may obtain audio samples from the at least server 106. These samples may represent raw data on which audio classification model is to be trained. The obtaining unit 402 may provide the obtained audio samples to the generating unit 404. The generating unit 404 may perform a time-shift process on each of the audio samples to generate multiple audio samples form a single audio sample. Time shift process may be a process used to alter the duration of an audio signal while preserving its pitch.

After generating multiple audio samples by using time-shifting operation, the generating unit 404 may provide the generated multiple samples to the obtaining unit 402. The obtaining unit 402 may obtain, from the at least server 106, characteristics information of each of the generated audio samples. The characteristics information may serve to describe essential attribute of the audio sample such as whether the audio sample may belong to the category of ADAS audio sample. If the audio sample belongs to the ADAS sample then which particular tone (such as tone related to lane departure warning tone, forward collision warning, and so on) class the audio sample represent. After obtaining characteristics information from the at least server 106, the obtaining unit 402 may label each audio sample with the characteristics information. For example, for a first task use label (i.e., first label information) 'NOT ADAS' and 'ADAS', and for a second task use tone class label (i.e., second label information) such as lane departure warning tone class label, forward collision warning class label, and so on.

After performing labelling process, the obtaining unit 402 may provide the audio samples information to the generating unit 404. The generation unit 404 may include an activation layer 410, such as a Rectified Linear Unit (ReLU) layer. The activation layer 410 may apply an elementwise activation function on the audio samples. The activation function may replace values in the audio samples with zero and leave positive values unchanged. The resulting volume of the activation layer 410 may be the same as the volume of the input of the activation layer 410. The generating unit 404 may perform feature extraction process on the audio samples that is received as the output of the activation layer 410. In an embodiment, the feature extraction process may involve a combination of time and frequency domain analysis by using Mel-Frequency Cepstral Coefficients (MFCC). Initially, the audio samples may undergo time domain analysis in order to extract information related to time domain features such as root mean square energy, zero-crossing rate, short-term energy, etc. After the time domain analysis, the MFCC may perform frequency domain analysis on the audio samples in order to extract information related to frequency domain features spectral bandwidth, spectral contrast, and other parameters that may provide insight into the characteristics of the audio sample in term of frequency composition.

After extraction features of the audio samples, the generating unit 404 may provide the audio samples and respective features information to the dividing unit 406. The dividing unit 406 may divide the audio samples into a set of samples. The division of sample may be not limited to any specific pattern. After dividing the samples into a set of samples, the set of audio samples and respective features information may be provided to the training unit 408. The training unit 408 may perform two tasks with same neural network architecture. In an embodiment, the training unit 408 may also use a regularization technique by using a regularization module 412 at a time of performing the two tasks and at a time of calculation of gradient of loss to allow the ML model 400-A to learn robust features. The regularization technique may dropout randomly selected neurons. In an embodiment, the neuron may be a fundamental unit in a neural network which may perform operations (i.e., the first task, the second task, or task related to calculation of gradient of loss).

In an embodiment, during the first task the set of the audio sample may be provided to a first layer of the neural network architecture. Before the first task, the training unit 408 may initially assign ML model parameters (weights (W) and biases (b)) as a random value.

After initializing the ML model parameters, the training unit 408 may perform a first task on the set of samples using a first activation function 414. In an exemplary embodiment, the first activation function 414 may be related to sigmoid activation. The first activation function 414 is not limited to said example but can be extended to various type of activation function. In an embodiment, the first activation function 414 may squash an output of the first task between 0 and 1 which may be suitable for generating probabilities indicating likelihood of belonging to positive class (i.e., ADAS class). The first task may correspond to identification of whether the audio samples may be the ADAS audio sample or the non-ADAS audio sample. After performing the first task on the set of samples, the predicted output related to first task may be generated. Sequentially, the training unit 408 may calculate binary cross-entropy loss for the first task. In an embodiment, binary cross-entropy loss for the first task may be calculated by computing the error between the predicated output and actual output (that is received from the generating unit 404 as the first label information) may be described below using function 1.

$$L_{TASK1} = -\frac{1}{N}\sum_{i=1}^{N}[yi \cdot \log(y \wedge i) + (1 - yi) \cdot \log(1 - y \wedge i)] \qquad (1)$$

where, N may be number of samples, yi may be an actual binary label for i-th sample, and yˆi may represent predicted probability of samples.

After performing the first task, the training unit 408 may perform a second task on the set of samples using a second activation function 416. In an exemplary embodiment, the second activation function 416 may be related to sigmoid activation. The second activation function 416 is not limited to said example but can be extended to various type of activation function. In an embodiment, the second activation function 416 may convert an output of the second task into a probability distribution over multiple classes which ensure output of the second task may be provide valid probable task. The second task corresponds to identification of audio class of the audio samples. After performing the second task on the set of samples, the predicted output related to the second task may be generated. Sequentially, the training unit 408 may calculate categorical cross-entropy loss for the second task. In an embodiment, binary cross-entropy loss for the second task may calculated by computing the error between the predicated output and actual output (that is received from the generating unit 404 as the second label information) may be described below using function 2.

$$L_{TASK2} = \sum_{i=1}^{N} \sum_{c=1}^{C} \left( y_{i,c} \log\left(y_{i,c}^{\wedge}\right) \right) \quad (2)$$

where, N may be a number of samples, C may be number of classes, $y_{i,c}$ may be an indicator function (1 if i-th sample belongs to class c, 0 otherwise), and $y_{i,c}^{\wedge}$ may be predicated probability of i-th sample with respect to the model.

After calculating the binary cross-entropy loss for the first task and categorical cross-entropy loss for the second task, the training unit 408 may calculate gradient of loss based on the binary cross-entropy loss for the first task and the categorical cross-entropy loss of the second task with respect to each parameters of the ML model 400-A. In particular, the training unit 408 may combine both the losses and calculate total loss as described below using function 3.

$$L_{Total} = \alpha L_{Task1} + \beta L_{Task2} \quad (3)$$

where, $\alpha$ and $\beta$ may be hyperparameters representing weights assigned to each task.

In a non-limiting exemplary embodiment of the present disclosure, values of hyperparameters i.e., $\alpha$=0.5 and $\beta$=0.5. The values of hyperparameters is not limited to said example but can be vary during development of the ML model 400-A. In an embodiment, the values of hyperparameters may adjust based on performance of the ML model 400-A.

After calculating combined loss, the training unit 408 may calculate the gradient of loss with respect to parameters of the ML model 400-A using a chain rule of calculus as described below using function 4.

$$\frac{\partial L_{Total}}{\partial \theta} = \alpha \frac{\partial L_{Task1}}{\partial \theta} + \beta \frac{\partial L_{Task2}}{\partial \theta} \quad (4)$$

where, $\theta$ may represent parameters of the ML model 400-A and may be represented as a vector containing all the individual weights and biases such as $\theta$=[W1, b1, W2, b2, . . . , Wn, bn]. In an embodiment, the gradient of loss may represent a vector of partial derivatives of a loss function with respect to the model parameters. may signify a relation between change of loss and the parameters of the ML model 400-A.

The training unit 408 may update the parameters of the ML model 400-A based on the gradient using an optimization algorithm. In particular, the training unit 408 may update a first moment and a second moment for each parameters of the ML model 400-A as described below using functions 5 and 6.

$$m_t = \beta_1 m_{t-1} + (1 - \beta_1) \frac{\partial L_{Total}}{\partial \theta} \quad (5)$$

-continued $$v_t = \beta_2 v_{t-1} + (1 - \beta_2) \left( \frac{\partial L_{Total}}{\partial \theta} \right)^2 \quad (6)$$

where, $m_t$ and $v_t$ may be moving averages of gradient and its square, respectively, $\beta_1$ and $\beta_2$ may be exponential decay rates, and t may represent current iteration. After updating the first movement and the second movement, the training unit 408 may correct bias in the first movement and the second movement as described below using functions 7 and 8.

$$m_t^{\wedge} = m_t/(1 - \beta_1 t) \quad (7)$$

$$v_t^{\wedge} = v_t/(1 - \beta_2 t) \quad (8)$$

Finally, the training unit 408 may update the parameters using the corrected movements as described below using function 9.

$$\theta_t = \theta_{t-1} - \frac{\eta}{\sqrt{v_t^{\wedge}} + \epsilon} m_t^{\wedge} \quad (9)$$

where, $\eta$ may be learning rate, $\epsilon$ may be small constant to prevent division by zero, and $\theta$ may represent model parameters. The training unit 408 may perform the fine tuning/updating parameters of the ML model 400-A for each set of samples of the generated samples. The training of the ML model 400-A may be used to perform the process described in description of FIG. 2.

Figure 4B:
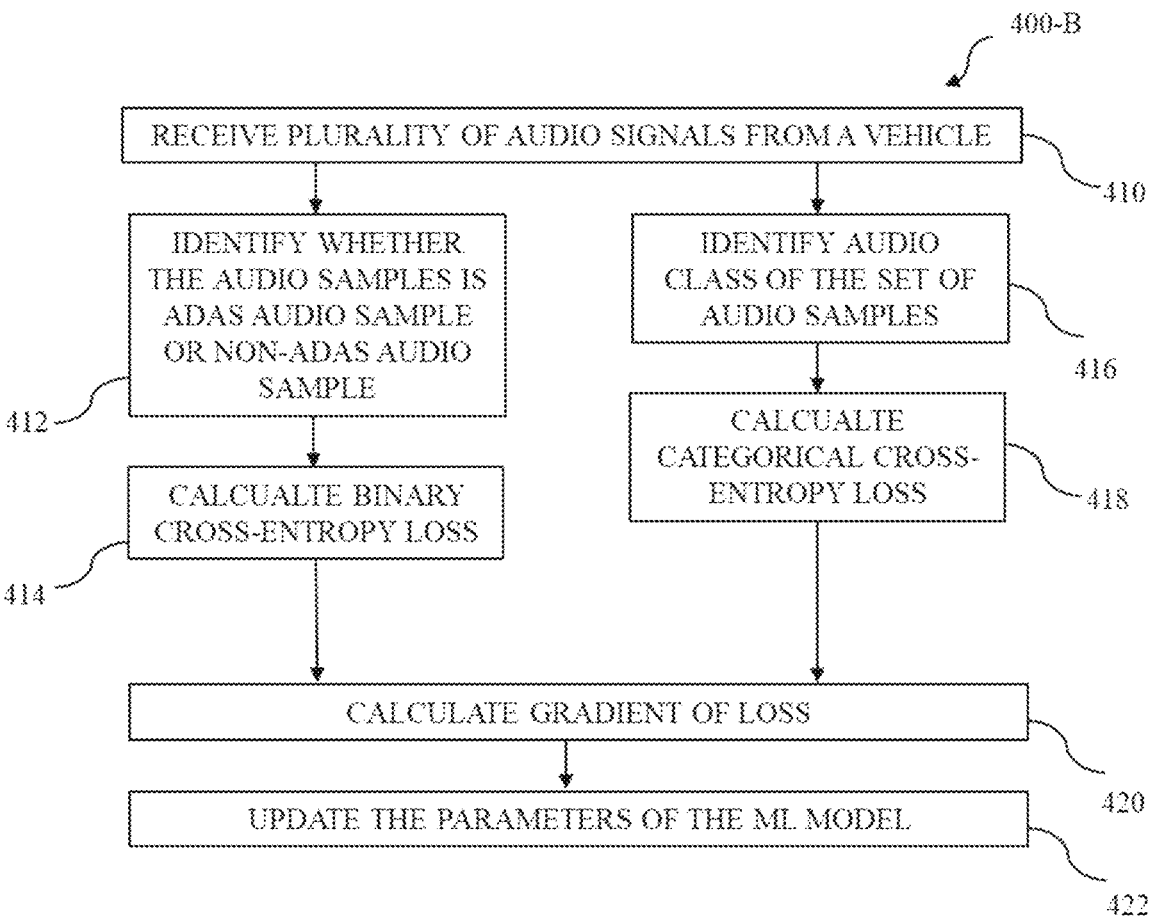
FIG. 4B a flow diagram illustrating a method for AI based ADAS testing tool, in accordance with an embodiment of the present disclosure.

Moving towards FIG. 4B showing steps of a method 400-B for training of ML model 400-A on the set of samples. The method start at step 410, at step 410 the method may include receiving the set of samples from the dividing unit 406 and label information of the set of samples.

At step 412, the method 400-B may include identifying whether the set of audio samples may be ADAS audio sample or non-ADAS audio sample and generating predicted output based on the identification.

At step 414, the method 400-B may include calculating a binary cross-entropy loss by computing the error between the predicated output and actual output (i.e., first label information described in foregoing paragraphs of description of the generating unit 404).

At step 416, the method 400-B may include identifying audio class of the set of audio samples generating predicted output based on the identification of the audio classes.

At step 418, the method 400-B may include calculating categorical cross-entropy loss by computing the error between the predicated output and actual output (i.e., second label information described in foregoing paragraphs of description of the generating unit 404). In an embodiment, the steps 416 and 418 may be performed simultaneously with the steps 412 and 414. In an alternative embodiment, the steps 416 and 418 may be performed after the step 414.

At step 420, the method 400-B may include calculating gradient of loss based on the binary cross-entropy loss (calculated in step 414) and the categorical cross-entropy loss (calculated in step 418) with respect to each parameters of the ML model 400-a.

Finally, at step 422, the method 400-B may include updating parameters of the ML model 400-a based on the gradient.

In an exemplary aspect, a training unit 408 of FIG. 4A may be configured to carry out the process steps disclosed in steps 412-420.

Figure 5:
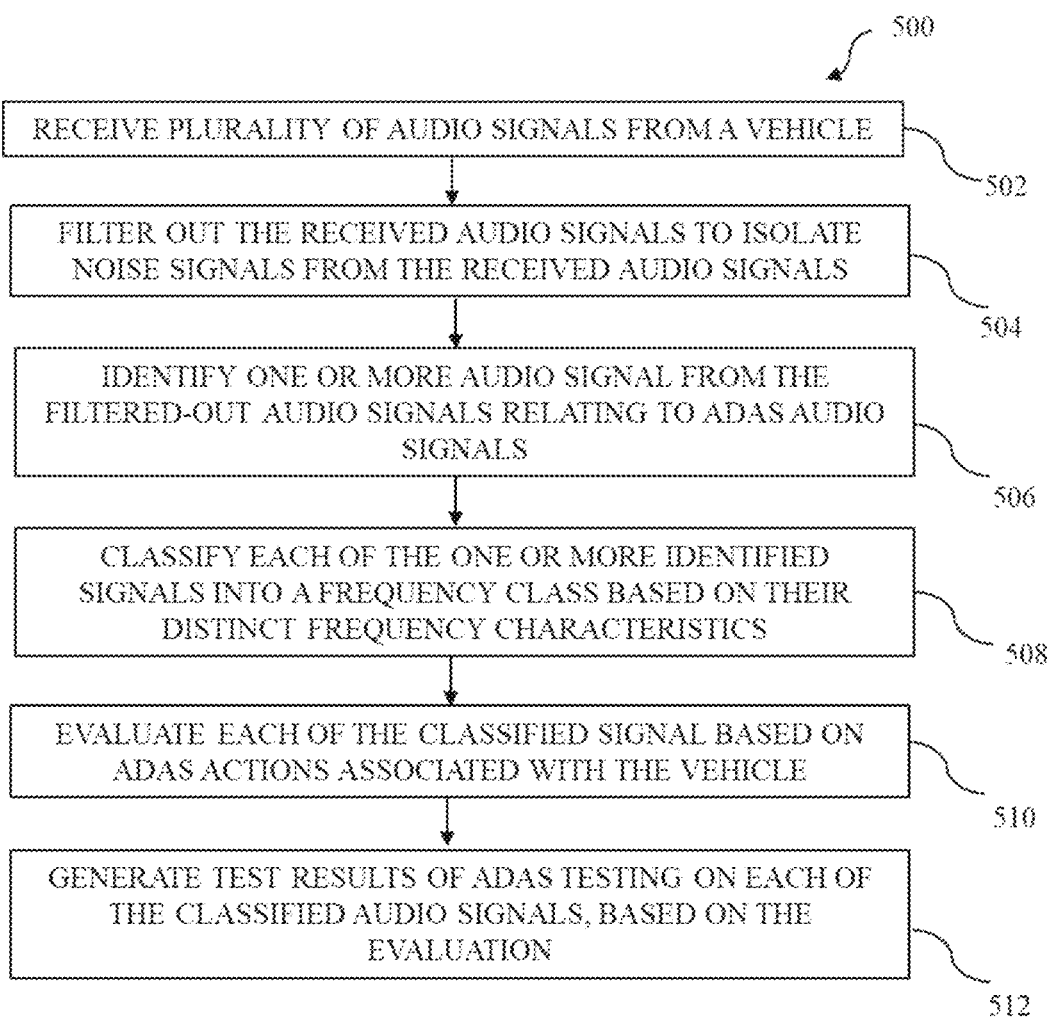
FIG. 5 a flow diagram illustrating a method for method for training of audio classification ML model on the set of samples, in accordance with an embodiment of the present disclosure.

Moving towards FIG. 5 showing steps of a method 500 for an Artificial Intelligence (AI) based Advanced Driver Assistance System (ADAS) testing tool 200. The method starts at step 502, at step 502 the method 500 may include receiving plurality of audio signals from a vehicle. In an exemplary aspect, an input interface 202 of FIG. 2 of the testing tool 200 may be configured to carry out the process steps disclosed in step 502.

At step 504, the method 500 may include filtering out, using a pre-trained noise cancellation ML model 206-a, the received audio signals to isolate noise signals from the received audio signals. Before performing filtering process training of the noise cancellation ML model 206-a is performed. The training step of the noise cancellation model 206-a may include obtaining a plurality of clean audio samples and a plurality of contaminated audio signals, including various noises, corresponding to the clean same audio samples from at least server 106. Finally, the training step may include filtering out the contaminated audio signals to isolate noise signals and clean audio samples and training the noise cancellation model based on the filtering. In an exemplary aspect, an filtering unit 206 of FIG. 2 of the testing tool 200 may be configured to carry out the process steps disclosed in step 504.

At step 506, the method 500 may include identifying, using a pre-trained audio classification ML model, one or more audio signal from the filtered-out audio signals relating to ADAS audio signals. In an exemplary aspect, a classification unit 208 of FIG. 2 of the testing tool 200 may be configured to carry out the process steps disclosed in step 506.

At step 508, the method 500 may include classifying, using the pre-trained audio classification ML model, each of the one or more identified signals into a frequency class based on their distinct frequency characteristics. Before performing the steps 506 and 508, the training of the audio classification ML model may be performed. The training step of the audio classification ML model may include obtaining audio samples from at least server 106 and generating multiple audio samples for each of the obtained audio sample by performing time-shift operation. Further, the training step may include obtaining, from the at least server 106, characteristics information of each of the generated audio samples, wherein the characteristics information indicates whether the audio sample is the ADAS audio and the respective audio class. Additionally, the training step may include extracting time and frequency parameters for the generated audio samples. Sequentially, the training step may include dividing the generated audio samples into a plurality of a set of audio samples. After dividing the audio samples, the training step may include distinguishing, by the classification ML model, the set of audio samples between the ADAS audio signal or the non ADAS audio signal to generate first set of predictions and identifying, by the classification ML model, the audio class of the set of audio samples to generate second set of predictions. Finally, the training step of the classification ML model may include generating loss based on the generated first set of predictions, the generated second set of predictions, and the obtained information and updating parameters associated with the classification ML model based on the generated loss during the training of the classification ML model. In an exemplary aspect, a classification unit 208 of FIG. 2 of the testing tool 200 may be configured to carry out the process steps disclosed in step 508.

At step 510, the method 500 may include evaluating each of the classified signal based on ADAS actions associated with the vehicle. In an exemplary aspect, a test case generation unit 210 of FIG. 2 of the testing tool 200 may be configured to carry out the process steps disclosed in step 510.

Finally, at step 512, the method may include generating test results of ADAS testing on each of the classified audio signals, based on the evaluation. The generation of test result may include identifying the ADAS actions associated with the vehicle and determining sample frequency classes based on the identified ADAS actions. Finally, the generation of test result may include validating the frequency class of each of the one or more identified signal with the determined sample frequency classes and generating the test results based on the validation. In an exemplary aspect, a test case generation unit 210 of FIG. 2 of the testing tool 200 may be configured to carry out the process steps disclosed in step 512.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used herein, the term unit may be implemented in hardware and/or in software. If the unit is implemented in hardware, the unit may be configured as a device, e.g., as a computer or as a processor or as a part of a system, e.g., a computer system. If the unit is implemented in software, the unit may be configured as a computer program product, as a function, as a routine, or as a program code.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively or additionally, some steps or methods may be performed by circuitry that is specific to a given function.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed is:

1. An Artificial Intelligence (AI) based Advanced Driver Assistance System (ADAS) testing tool comprising:
    an input interface configured to receive plurality of audio signals from a vehicle;
    a processing unit operatively coupled to the input interface and configured to:
        filter out, using a pre-trained noise cancellation ML model, the received audio signals to isolate noise signals from the received audio signals;
        identify, using a pre-trained audio classification ML model, one or more audio signal from the filtered-out audio signals relating to ADAS audio signals;
        classify, using the pre-trained audio classification ML model, each of the one or more identified signals into a frequency class based on their distinct frequency characteristics;
        evaluate each of the classified signal based on ADAS actions associated with the vehicle; and
        generate test results of ADAS testing on each of the classified audio signals, based on the evaluation.

2. The testing tool of claim 1, wherein, to generate the test result, processing unit is further configured to:
    identify the ADAS actions associated with the vehicle;
    determine sample frequency classes based on the identified ADAS actions;
    validate the frequency class of each of the one or more identified signal with the determined sample frequency classes; and
    generate the test results based on the validation.

3. The testing tool of claim 1, wherein to train the noise cancellation model, the processing unit is configured to:
    obtain a plurality of clean audio samples and a plurality of contaminated audio signals, including various noises, corresponding to the clean same audio samples from at least a server;
    filter out the contaminated audio signals to isolate noise signals and clean audio samples; and
    train the noise cancellation model based on the filtering.

4. The testing tool of claim 1, wherein, in order to train the audio classification ML model, the processing unit is configured to:
    obtain audio samples from at least a server;
    generate multiple audio samples for each of the obtained audio sample by performing time-shift operation;
    extract time and frequency parameters for the generated audio samples;
    train the classification ML model by using the time and frequency parameters of the generated audio samples to distinguish between ADAS audio signal or non ADAS audio signal; and
    train the classification ML model by using the time and frequency parameters of the generated ADAS audio samples to identify the audio classes of the audio samples.

5. The testing tool of claim 4, wherein the processing unit is configured to:
    obtain, from the at least server, characteristics information of each of the generated audio samples, wherein the characteristics information indicates whether the audio sample is the ADAS audio signal and the respective audio class;
    divide the generated audio samples into a plurality of a set of audio samples;
    distinguish, by the classification ML model, the set of audio samples between the ADAS audio signal or the non ADAS audio signal to generate first set of predictions;
    identify, by the classification ML model, the audio class of the set of audio samples to generate second set of predictions;
    generate loss based on the generated first set of predictions, the generated second set of predictions, and the obtained information; and
    update parameters associated with the classification ML model based on the generated loss during the training of the classification ML model.

6. A method for an Artificial Intelligence (AI) based Advanced Driver Assistance System (ADAS) testing tool, comprising:
    receiving plurality of audio signals from a vehicle;
    filtering, using a pre-trained noise cancellation ML model, the received audio signals to isolate noise signals from the received audio signals;
    identifying, using a pre-trained audio classification ML model, one or more audio signal from the filtered audio signals relating to ADAS audio signals;
    classifying, using the pre-trained audio classification ML model, each of the one or more identified signals into a frequency class based on their distinct frequency characteristics;
    evaluating each of the classified signal based on ADAS actions associated with the vehicle; and
    generating test results of ADAS testing on each of the classified audio signals, based on the evaluation.

7. The method of claim 6, wherein the generation of the test result further comprises:
    identifying the ADAS actions associated with the vehicle;
    determining sample frequency classes based on the identified ADAS actions;
    validating the frequency class of each of the one or more identified signal with the determined sample frequency classes; and
    generating the test results based on the validation.

8. The method of claim 6, wherein training of the noise cancellation model comprises:

obtaining a plurality of clean audio samples and a plurality of contaminated audio signals, including various noises, corresponding to the clean same audio samples from at least a server;

filtering the contaminated audio signals to isolate noise signals and clean audio samples; and training the noise cancellation model based on the filtering.

9. The method of claim 6, wherein training of the audio classification ML model comprises:

obtaining audio samples from at least a server;

generating multiple audio samples for each of the obtained audio sample by performing time-shift operation;

extracting time and frequency parameters for the generated audio samples;

training the classification ML model by using the time and frequency parameters of the generated audio samples to distinguish between ADAS audio signal or non ADAS audio signal; and training the classification ML model by using the time and frequency parameters of the generated ADAS audio samples to identify the audio classes of the audio samples.

10. The method of claim 9, further comprising:

obtaining, from the at least server, characteristics information of each of the generated audio samples, wherein the characteristics information indicates whether the audio sample is the ADAS audio and the respective audio class;

dividing the generated audio samples into a plurality of a set of audio samples;

distinguishing, by the classification ML model, the set of audio samples between the ADAS audio signal or the non ADAS audio signal to generate first set of predictions;

identifying, by the classification ML model, the audio class of the set of audio samples to generate second set of predictions;

generating loss based on the generated first set of predictions, the generated second set of predictions, and the obtained information; and updating parameters associated with the classification ML model based on the generated loss during the training of the classification ML model.

11. A non-transitory computer-readable medium storing computer-executable instructions for an Artificial Intelligence (AI) based Advanced Driver Assistance System (ADAS) testing tool, comprising:

receiving plurality of audio signals from a vehicle;

filtering the received audio signals to isolate noise signals from the received audio signals;

identifying one or more audio signal from the filtered audio signals relating to ADAS audio signals;

classifying each of the one or more identified signals into a frequency class based on their distinct frequency characteristics;

evaluating each of the classified signal based on ADAS actions associated with the vehicle; and generating test results of ADAS testing on each of the classified audio signals, based on the evaluation.

12. The non-transitory computer-readable medium of claim 11, where to generate the test result, the computer-executable instructions are configured for:

identifying the ADAS actions associated with the vehicle;

determining sample frequency classes based on the identified ADAS actions;

validating the frequency class of each of the one or more identified signal with the determined sample frequency classes; and generating the test results based on the validation.

13. The non-transitory computer-readable medium of claim 11, wherein to train the noise cancellation model, the computer-executable instruction are configured for:

obtaining a plurality of clean audio samples and a plurality of contaminated audio signals, including various noises, corresponding to the clean same audio samples from at least a server;

filtering the contaminated audio signals to isolate noise signals and clean audio samples; and training the noise cancellation model based on the filtering.

14. The non-transitory computer-readable medium of claim 11, wherein to train the audio classification ML model, the computer-executable instruction are configured for:

obtaining audio samples from at least a server;

generating multiple audio samples for each of the obtained audio sample by performing time-shift operation;

extracting time and frequency parameters for the generated audio samples;

training the classification ML model by using the time and frequency parameters of the generated audio samples to distinguish between ADAS audio signal or non ADAS audio signal; and training the classification ML model by using the time and frequency parameters of the generated ADAS audio samples to identify the audio classes of the audio samples.

15. The non-transitory computer-readable medium of claim 14, the computer-executable instruction are configured for:

obtaining, from the at least server, characteristics information of each of the generated audio samples, wherein the characteristics information indicates whether the audio sample is the ADAS audio and the respective audio class;

dividing the generated audio samples into a plurality of a set of audio samples;

distinguishing the set of audio samples between the ADAS audio signal or the non ADAS audio signal to generate first set of predictions;

identifying the audio class of the set of audio samples to generate second set of predictions;

generating loss based on the generated first set of predictions, the generated second set of predictions, and the obtained information; and updating parameters associated with the classification ML model based on the generated loss during the training of the classification ML model.

* * * * *